US009070056B1

(12) United States Patent
Emoff et al.

(10) Patent No.: US 9,070,056 B1
(45) Date of Patent: Jun. 30, 2015

(54) INCENTIVE REWARDS AND METHODS

(75) Inventors: Michael J. Emoff, Oakwood, OH (US); Christopher Sean Wire, Centerville, OH (US); Todd Spencer Blair, Troy, OH (US); Jennifer Marie Gobrail, Oakwood, OH (US); Crystal Dawn Dennis, Dayton, OH (US); Mary Katherine Page, Dayton, OH (US); Andrew Stephen Althouse, West Carrollton, OH (US)

(73) Assignee: Boost Technologies, LLC, Dayton, OH (US)

( * ) Notice: Subject to any disclaimer, the term of this patent is extended or adjusted under 35 U.S.C. 154(b) by 0 days.

(21) Appl. No.: 13/135,205

(22) Filed: Jun. 28, 2011

Related U.S. Application Data

(60) Provisional application No. 61/398,606, filed on Jun. 28, 2010.

(51) Int. Cl.
*G06K 19/00* (2006.01)
*G06K 19/04* (2006.01)

(52) U.S. Cl.
CPC .............. *G06K 19/04* (2013.01); *G06K 19/041* (2013.01)

(58) Field of Classification Search
CPC ................ G06K 19/04; G06K 19/041; G06K 19/06028; G06K 19/06037
USPC ........ 235/487, 493, 494, 462.01, 462.09, 486
See application file for complete search history.

(56) References Cited

U.S. PATENT DOCUMENTS

| | | | | |
|---|---|---|---|---|
| 2,834,129 A * | 5/1958 | Kirkbride | ...................... | 40/1.5 |
| 2,926,915 A * | 3/1960 | Johns | ........................... | 273/352 |
| 3,192,655 A * | 7/1965 | Harn | ................................ | 40/1.5 |
| 3,942,273 A * | 3/1976 | Adams | ............................ | 40/1.5 |
| 3,953,932 A * | 5/1976 | Graves | ........................ | 40/27.5 |
| 5,292,127 A * | 3/1994 | Kelly et al. | ............... | 273/118 A |
| 5,406,264 A * | 4/1995 | Plonsky et al. | ............... | 235/493 |
| 5,746,638 A * | 5/1998 | Shiraishi | ........................ | 446/92 |
| 5,816,918 A * | 10/1998 | Kelly et al. | ..................... | 463/16 |
| 5,853,823 A * | 12/1998 | McKenna | ........................ | 428/7 |
| 6,015,344 A * | 1/2000 | Kelly et al. | ..................... | 463/16 |
| 6,122,805 A * | 9/2000 | Haegley | ...................... | 24/114.4 |
| 6,339,866 B1 * | 1/2002 | French | ............................ | 24/306 |
| 7,096,614 B1 * | 8/2006 | Williams | ........................ | 40/1.5 |
| 7,198,196 B2 * | 4/2007 | Halbur et al. | ................. | 235/487 |
| 7,905,416 B2 * | 3/2011 | Halbur et al. | ................. | 235/487 |
| 8,141,876 B2 * | 3/2012 | Humphreys et al. | .......... | 273/156 |
| 2003/0233276 A1 * | 12/2003 | Pearlman et al. | ............... | 705/14 |
| 2004/0254836 A1 * | 12/2004 | Emoke Barabas et al. | ..... | 705/14 |
| 2005/0011093 A1 * | 1/2005 | Peterson | ........................ | 40/27.5 |
| 2005/0049965 A1 * | 3/2005 | Jen | .................................. | 705/39 |
| 2005/0170739 A1 * | 8/2005 | Zoellner | ........................ | 446/92 |
| 2005/0173054 A1 * | 8/2005 | Peterson | ........................ | 156/263 |
| 2005/0263463 A1 * | 12/2005 | Fukuda | ........................ | 211/71.01 |
| 2006/0053056 A1 * | 3/2006 | Alspach-Goss et al. | ........ | 705/14 |
| 2006/0205481 A1 * | 9/2006 | Dominelli | ...................... | 463/25 |
| 2006/0271433 A1 * | 11/2006 | Hughes | ........................... | 705/14 |
| 2007/0020596 A1 * | 1/2007 | Thurman | ...................... | 434/238 |
| 2007/0023531 A1 * | 2/2007 | Halbur et al. | ................. | 235/493 |
| 2007/0078710 A1 * | 4/2007 | Bender | ........................... | 705/14 |

(Continued)

*Primary Examiner* — Paultep Savusdiphol
(74) *Attorney, Agent, or Firm* — Walters & Wasylyna LLC

(57) ABSTRACT

Incentive rewards awarded to a recipient have a code unique to each reward. Receipt of a reward may be reported by the Internet or the intranet. Plural rewards can be connected together to form a trophy. The incentive rewards can be connected to one another by the use of magnets on the rewards.

17 Claims, 2 Drawing Sheets

(56) References Cited

U.S. PATENT DOCUMENTS

| | | | |
|---|---|---|---|
| 2007/0105616 A1* | 5/2007 | Chapet et al. | 463/25 |
| 2007/0260511 A1* | 11/2007 | Bender, II | 705/14 |
| 2007/0283601 A1* | 12/2007 | Peterson | 40/27.5 |
| 2008/0023343 A1* | 1/2008 | Macor | 206/81 |
| 2008/0023344 A1* | 1/2008 | Macor | 206/81 |
| 2008/0023351 A1* | 1/2008 | Macor | 206/232 |
| 2008/0023371 A1* | 1/2008 | Macor | 206/775 |
| 2008/0149518 A1* | 6/2008 | Macor | 206/459.5 |
| 2008/0153567 A1* | 6/2008 | Juds et al. | 463/16 |
| 2008/0280661 A1* | 11/2008 | Shoemaker, Jr. | 463/7 |
| 2008/0290177 A1* | 11/2008 | Halbur et al. | 235/494 |
| 2009/0157492 A1* | 6/2009 | Sims, Jr. | 705/11 |
| 2009/0191962 A1* | 7/2009 | Hardy et al. | 463/29 |
| 2010/0223120 A1* | 9/2010 | Dragt | 705/14.27 |
| 2011/0106597 A1* | 5/2011 | Ferdman et al. | 705/14.11 |
| 2011/0131108 A1* | 6/2011 | Doxey | 705/26.1 |

* cited by examiner

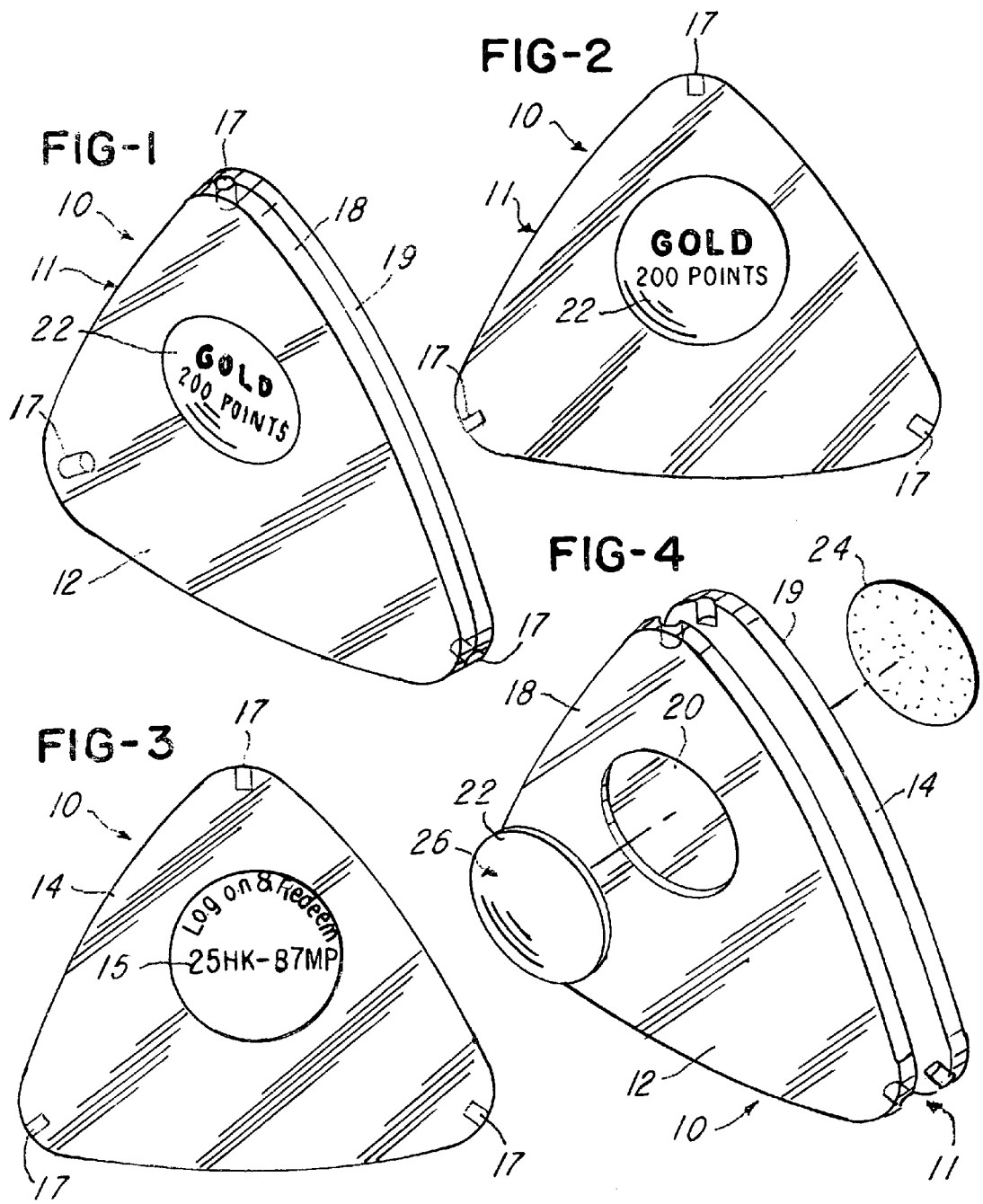

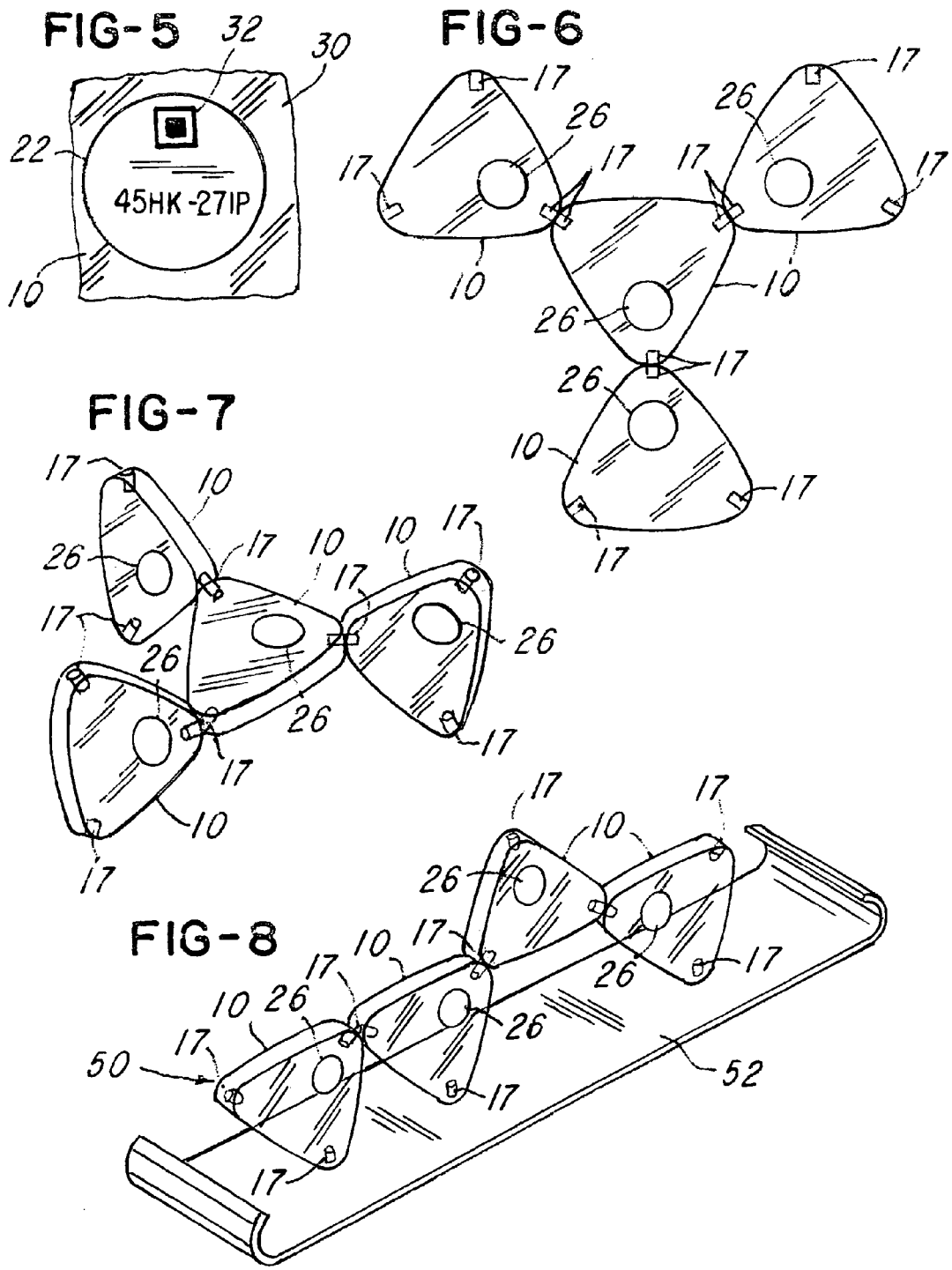

INCENTIVE REWARDS AND METHODS

CROSS-REFERENCE TO RELATED APPLICATION

This application claims the benefit of provisional application of Michael J. Emoff et al., No. 61/398,606, filed Jun. 28, 2010, for "Incentive Rewards and Methods."

FIELD OF THE INVENTION

This invention relates to incentive rewards that may be given by an organization to employees, agents, customers, benefactors or honorees of, or to suppliers to, the organization. This invention also relates to methods for using the incentive rewards.

BRIEF DESCRIPTION OF THE DRAWINGS

FIG. 1 is a perspective view of a first embodiment of an incentive reward in accordance with this invention.

FIG. 2 is front elevational view of the reward of FIG. 1.

FIG. 3 is a rear elevational view of the reward of FIG. 1.

FIG. 4 is an exploded perspective view of the reward of FIG. 1 simplified by the Omission of printed matter.

FIG. 5 is a fragmentary elevation view of second embodiment of an incentive reward in accordance with this invention.

FIG. 6 is top plan view of an array of incentive rewards in accordance with this invention that are connected together.

FIG. 7 is a perspective view from above and the right of another array of incentive rewards that are connected together.

FIG. 8 is a perspective view illustrating another possible array of plural incentive rewards of this invention shown assembled on a plate.

DESCRIPTION OF THE INVENTION

Incentive rewards in accordance with this invention are in the form of tokens or coins that can be connected to one another to form trophies. The rewards may have means indicting the value of the token and may also bear an identifying code thereon unique to the individual reward so that a reward recipient could report receipt of the reward to an organization which accumulates the rewards on behalf of reward recipients. After the reward is so reported, the recipient can use the reward in any fashion the recipient desires without the ability to report the same reward a second time.

A sample of such an incentive reward, designated 10, is illustrated in FIGS. 1 through 3. Reward 10 has a unitary, self-supporting body 11, with one face 12, termed the front face herein, with indicia or words indicating the value of the reward 10. In the example shown in the drawings, the reward 10 has a value arbitrarily designated as "200 points." Obviously the value could be expressed in various other terms, such as monetary amounts. Optionally, the value may be expressed by color coding, as indicated by the word "Gold" printed on the front face of the reward 10, which could appear with gold coloring. Other rewards (not shown) could be essentially identical to the reward 10 except some may have different point values and different colors.

With reference to FIG. 3, and for reasons discussed below, the back face 14 of the reward 10 may have an identifying alpha-numeric code 15, herein shown as "25 HK-87 MP," that may be unique to that particular reward 10. Optionally (and obviously), the code could be entirely alpha or entirely numeric or incorporate other symbols.

Small magnets 17 are placed around the outer periphery of the incentive reward 10. The particular incentive reward 10 illustrated in the drawings is generally in the form of an equilateral triangle with rounded corners and convex sides and there are three magnets 17, one located adjacent each point or corner of its triangular shape. Magnets 17 may comprise readily available cylindrical bar magnets, each snugly received within small holes at each corner. A suitable glue (not shown) may be used to attach the magnets 17 to the body 11.

FIG. 4 illustrates that the reward 10 may be made from two mutually coextensive plates, a front plate 18 and a back plate 19, that are glued together back-to-back. Both plates 18 and 19 may have recessed portions, such as that illustrated at 20 in FIG. 4, in which paper or plastic decals 22 and 24 are glued. Printing and coloration on the front face 10 and the back face 12 may be obtained by printing and coloring the decals 22 and 24. The front decal 22 may have a transparent epoxy drop placed on it to create a slightly rubbery convex mound 26 on its front face. The decals 22 and 24 may be opaque and the plastic plates 18 and 19 may be transparent or translucent or opaque or partly transparent, and/or translucent and/or opaque.

In use, the recipient of a reward 10 may enter the code at an Internet or intranet address maintained by or for the organization that uses the rewards 10 as part of a reward program.

Each code may be unique so that the enterprise in charge of the reward system which uses rewards 10 will recognize when a particular reward 10 has been added to an account maintained for recipients and not permit the same reward to be used a second time to increase the size of any of the recipients' accounts. Therefore a reward 10 may be used for any purpose desired by the recipient after it has been reported to the bank or other organization that maintains recipients' accounts.

One use of the rewards 10 is illustrated in FIGS. 6, 7 and 8, which is to use plural rewards 10 accumulated by a recipient to assemble various combinations that may be considered to be larger trophies. FIG. 6 shows a flat, horizontal array 40 of rewards 10 connected together by their respective magnets. FIG. 8 shows the same rewards 10 with the outer three rewards rotated to a vertical orientation so as to support the center reward 10 above a floor or table.

FIG. 8 shows an embodiment 50 wherein a ferrous plate 52 is provided to provide better support for the rewards 10 due to the attraction of the magnets 17 to the plate 52.

The rewards 10 may be made from various plastic materials, such as ABS molded plastic. The magnets 17 may be standard polarized magnets pushed into tight holes and fit without adhesive, but may be glued in place as indicated above. In order to assure that the rewards 10 can be magnetically connected to one anther, the outer end of one of three magnets 17 in a reward 10 may have a polarity opposite the polarity of the outer ends of the other two magnets 17. The decals may be made from high gloss paper with permanent adhesive but could be made from plastic or other material.

FIG. 5 shows a second embodiment of an incentive reward, designated 30, in accordance with this invention, which may be identical to the reward 10 of FIGS. 1-3, but is provided with two codes, one being alpha-numeric as an example, the other being a QR code represented at 32. Provision of the QR code would enable the recipient of the reward 32 to take a photograph of the QR code 32 using a camera portion of a cell phone or a smart phone (not shown) and transmit the QR code by phone to a remote computer (not shown) which records the receipt of the reward 32 by the recipient. Bar codes (not shown) could also be used along with, or in place of, other codes associated with the incentive rewards of this invention.

Although the presently preferred embodiments of this invention has been described, it will be understood that within the purview of the invention various changes may be made within the scope of the following claims.

The invention claimed is:

1. An incentive reward trophy comprising a plurality of incentive reward tokens, each reward token of said plurality of reward tokens comprising:
   a plurality of spaced apart magnets located about a periphery thereof for connecting adjacent reward tokens together in an end-to-end configuration, wherein at least one magnet of said plurality of magnets comprises an opposite polarity from at least one other magnet of said plurality of magnets; and
   an assigned value, in points, wherein said points are redeemable by a recipient for a reward, and wherein said plurality of reward tokens are connected together in said end-to-end configuration forming a recipient defined combination to demonstrate possession of said plurality of reward tokens.

2. The trophy of claim 1 wherein each of said reward tokens comprises a code thereon, wherein said code uniquely associates said reward token with said value, and wherein said points are portable only once.

3. The trophy of claim 1 wherein each of said reward tokens comprises an indicator of said value of said reward token.

4. The trophy of claim 1 wherein each of said reward tokens comprises a code to uniquely associate said reward token with said value and an indicator of said value of said reward token, wherein an organization accumulates said points on behalf of said recipient, and wherein said organization consumes at least a portion of said points accumulated when redeemed for said reward by said recipient.

5. The trophy of claim 4 wherein each of said reward tokens comprises:
   a pair of generally triangular shaped plates affixed together to form a body, each of said plates comprising an exterior surface;
   a plurality of spaced apart magnets located about a periphery of said body for connecting adjacent reward tokens together in said end-to-end configuration; and,
   a recessed portion disposed within said exterior surface of each of said plates;
   wherein said code and said indicator comprise a decal affixed within each recessed portion;
   wherein at least one of said plurality of magnets is located about each corner of said body between said pair of plates; and,
   wherein at least one magnet of said plurality of magnets comprises an opposite polarity from at least one other magnet of said plurality of magnets.

6. The trophy of claim 1 wherein each of said reward tokens comprises a generally triangular-shaped body; wherein at least one of said plurality of magnets is located about each corner of said body.

7. An incentive reward token comprising:
   a body;
   a plurality of spaced apart magnets located about a periphery of said body, wherein at least one magnet of said plurality of magnets comprises an opposite polarity from at least one other magnet of said plurality of magnets;
   a value, in points, assigned to said reward token by an organization that accumulates said points on behalf of a recipient of said reward token; and
   a code disposed on said body to uniquely associate said reward token with said value,
   wherein said points are redeemable by said recipient for a reward.

8. The reward token of claim 7 further comprising an indicator of said value of said reward token, said indicator being disposed on said body.

9. The reward token of claim 8 wherein said body comprises:
   a pair of plates affixed together, each of said plates comprising an exterior surface; and,
   a recessed portion disposed within said exterior surface of each of said plates;
   wherein said code and said indicator comprise a decal affixed within each recessed portion.

10. The reward token of claim 7 wherein a plurality of said incentive reward tokens are connected together in an end-to-end configuration to form a recipient defined combination trophy.

11. An incentive reward method comprising the steps of:
   receiving, by a recipient, a reward token, said reward token comprising:
      a body;
      a plurality of spaced apart magnets located about a periphery of said body, wherein at least one magnet of said plurality of magnets comprises an opposite polarity from at least one other magnet of said plurality of magnets;
      a value, in points, assigned to said reward token by an organization that accumulates said points on behalf of said recipient of said reward token;
      a code disposed on said body to uniquely associate said reward token with said value; and
      an indicator disposed on said body to identify said value of said reward token;
   reporting, by said recipient, receipt of said reward token to said organization;
   recording, by said organization, receipt of said reward token when reported, wherein said recording step comprises adding said value to a point total;
   redeeming, by said recipient, at least a portion of said point total for a reward.

12. The method of claim 11 further comprising:
   receiving, by said recipient, a plurality of reward tokens; and
   forming, by said recipient, a recipient defined incentive reward trophy comprising said plurality of reward tokens, wherein said plurality of reward tokens are connected in an end-to-end configuration.

13. The method of claim 11 wherein reporting receipt of said reward token is performed by transmission of said code by the Internet or by an intranet.

14. The method of claim 11 wherein reporting receipt of said reward token is performed by transmission of a photograph of said code.

15. The method of claim 11 wherein said code is an alphanumeric code.

16. The method of claim 11 wherein said code is a bar code.

17. The method of claim 11 wherein said code is a QR code.

* * * * *